Nov. 27, 1956 J. P. DORR 2,771,682
PRINTING PLATE GAUGE
Filed Aug. 21, 1952
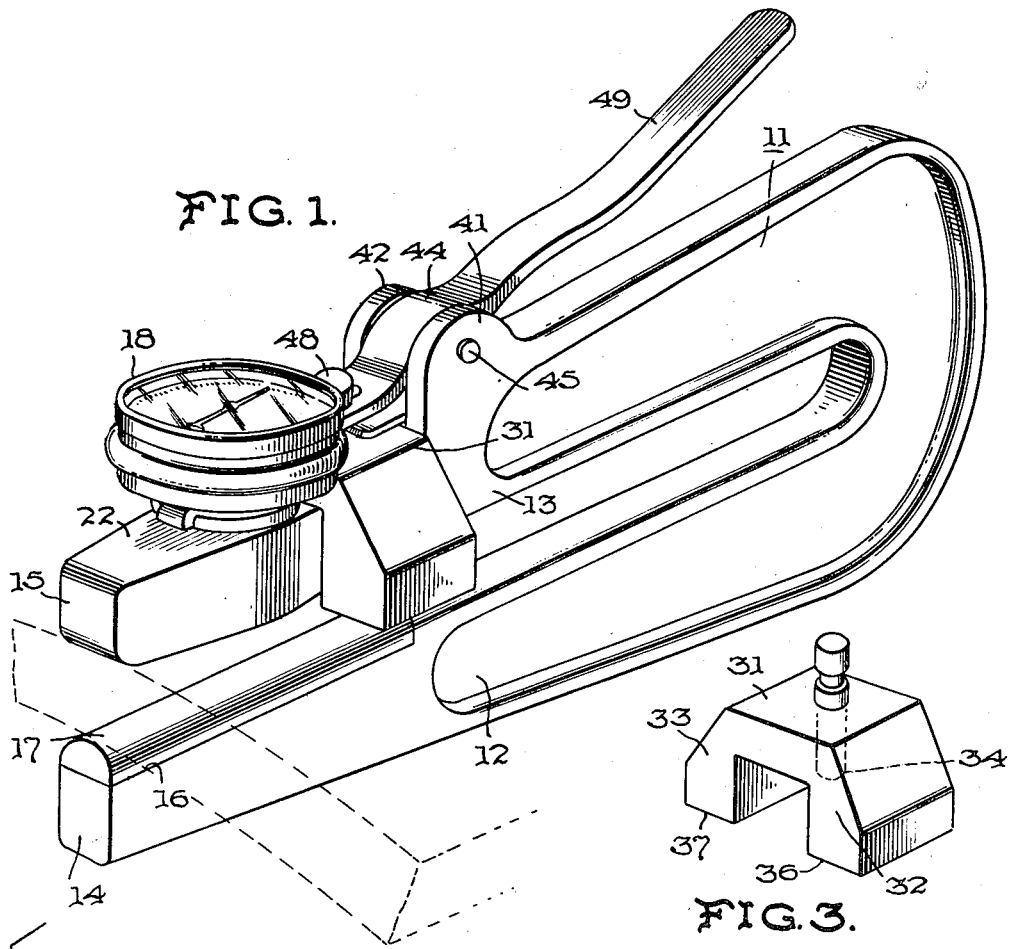
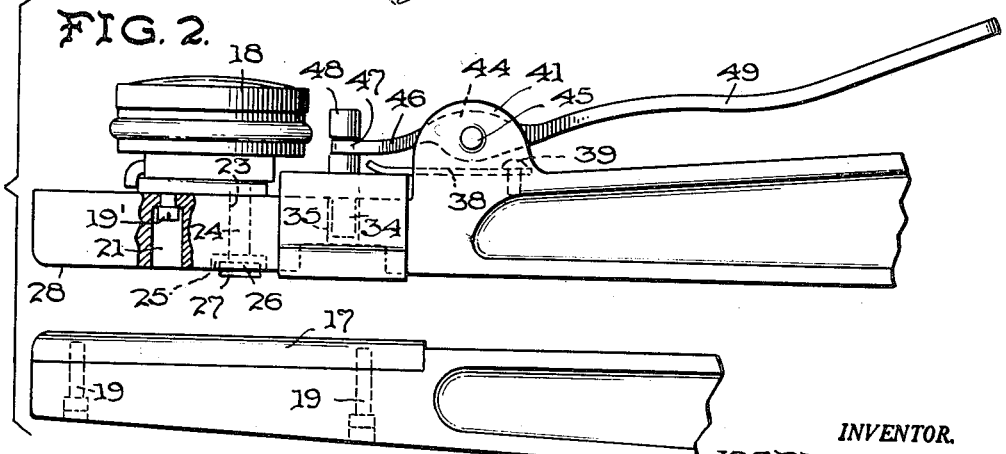
INVENTOR.
JOSEPH P. DORR
BY
his ATTORNEYS

United States Patent Office 2,771,682
Patented Nov. 27, 1956

2,771,682

PRINTING PLATE GAUGE

Joseph P. Dorr, Silver Spring, Md.

Application August 21, 1952, Serial No. 305,548

7 Claims. (Cl. 33—147)

This invention relates to gauges for indicating variations in the thickness of curved printing plates such as stereotype plates, electrotype plates, zinc plates, used in the art of printing.

Frequently during the printing operation, imperfections appear in the material being printed. Particularly in newspaper operations, it is essential that the cause of these imperfections be ascertained promptly and corrected without delay. One cause of such imperfections is a flaw in the printing plate itself. This can be most easily ascertained by measuring the area of the printing plate which is printing the imperfect copy to determine whether that area conforms with the standard area for the overall plate. If there is any variation in the thickness of the plate in the area which is printing the imperfect copy, a quick determination of the flaw in the printing plate enables the plate to be recast and replaced.

Heretofore, it has been necessary either to cut up the imperfect plate and then measure the thickness with a micrometer or use a gauge which has been bulky and cumbersome, weighing a considerable number of pounds and requiring two hands for operation.

A major object of the present invention is to provide an improved gauge for indicating variations in the thickness of curved printing plates and which is compact, inexpensive to manufacture, is light in weight and may be manipulated with one hand by an operator.

In the attainment of this object, one feature of the invention resides in the provision of a light-weight frame having co-extensive arms with an abutment on the inner face of one arm and a cooperating thickness indicator plunger extending through the other arm. The abutment and the indicator are arranged at the ends of the arms and the gauge is properly positioned with respect to the plate by a clamping member slidably mounted near the indicator to cooperate with the abutment and align the gauge in a plane extending radially of the curved printing plate. A lever for operating the clamping member is disposed so it may be operated by either the thumb or the fingers of the same hand by which the operator is holding the instrument, leaving his other hand free to manipulate the printing plate.

These and other objects and features of the invention will become apparent from the following specification taken in conjunction with the accompanying drawings, wherein:

Fig. 1 is a perspective view of a portable gauge embodying the invention in its preferred form;

Fig. 2 is a fragmentary side elevation view with some parts shown in section and others broken away for purposes of clearness; and Fig. 3 is a perspective view of the clamping member incorporated in the gauge shown in Fig. 1.

In the preferred form of the invention illustrated in the drawings, the gauge comprises a frame 11 generally of C-shape and having a pair of elongated substantially co-extensive arms 12 and 13 of approximately the same length so their terminals 14 and 15 are disposed one above the other. Near its outer end, lower arm 12 has its inner face 16 machined to receive a convex anvil 17 which is retained in position as by bolts 19. Preferably, the width of abutment 17 is the same as the width of the arm 12 at its end and the abutment may be of semi-circular shape so it presents a convex surface for engaging the concave inner surface of the printing plate and providing a substantially linear contact therewith.

A conventional thickness indicator 18 is secured as by set screw 19' disposed in counterbore 21 in the upper arm 13 to exposed surface 22 of that upper arm. The upper arm is provided with a bore 23 through which extends plunger 24 for operating the thickness gauge 18. Bore 23 is provided at the inner face of the upper arm with a counterbore 25 forming a recess in which head 26 on the plunger 24 may operate. Normally, exposed plate-engaging surface 27 of the head 26 is disposed slightly below the inner surface 28 of the upper arm 13. Also, plate-engaging surface 27 of the plunger 24 is positioned a predetermined distance from the convex surface of abutment 17.

For the purpose of properly orienting the gauge with respect to the curved printing plate, a clamping member 31 has legs 32 and 33 disposed on opposite sides of the upper arm 13. A rod 34 extends inwardly from the web of the clamping member and provides a slidable guiding fit with bore 35 extending vertically of the upper arm 13. Legs 32 and 33 are respectively provided with plate-engaging faces 36 and 37 for engaging the convex surface of the printing plate. Normally, clamping member 31 is urged by a leaf spring 38, secured as by rivet 39 to the upper surface of the upper arm 13, toward the abutment 17. Thus, the action of spring 39 presses plate-engaging faces 36 and 37 into engagement with the convex surface of the printing plate at opposite sides of the line contact made by abutment 17 with the concave surface of the plate. This automatically manipulates the gauge so it assumes a position in a plane extending radially of the curved printing plate. This plane extends through the line contact made by abutment 17 with the concave surface of the plates so plate-engaging surface 27 on the plunger 24 of the indicator 18 engages the convex surface of the plate in the same plane and thereby provides an accurate indication of the thickness of the plate in the area engaged by the head 26.

For the purpose of manipulating clamping member 31 against the action of spring 38, upper arm 13 is provided with a bracket formed by a pair of transversely-spaced ears 41 and 42 extending from the outer surface of the arm. Disposed between these ears is a lever 44 pivotally mounted on a pin 45 extending transversely between the ears. One end 46 of lever 44 is coupled at 47 to a stud 48 extending upwardly from the clamping member which is disposed between the indicator 18 and the bracket formed by the ears 41 and 42. The other end of lever 44 is provided with a manually operable extension 49 extending adjacent the upper surface of the arm 13 toward the rear end thereof.

In operation, the plate to be measured or checked for imperfections is manipulated by the operator with one hand while the gauge is held in the other hand. The operator depresses extension 49 of the lever 44 to lift clamping member 31 against the action of spring 38 and away from the abutment 17. Then, he slides the gauge over the edge of the curved printing plate until the head 26 is disposed in the area where the imperfection is suspected. Next, he releases the lever 49 so plate-engaging surfaces 36 and 37 of the clamping member engage the convex surface of the printing plate and cooperate with convex abutment 17 to manipulate the gauge and orient it in a plane extending radially of the curved printing plate. A glance at the indicator 18 indicates whether the thickness of the plate is correct or above or below the desired measurement.

For purposes of calibrating the indicator, a block (not shown) of predetermined thickness may be provided with the gauge and inserted between the abutment and the clamping member. Then, the indicator may be adjusted to indicate zero so subsequent use of the gauge will provide a plus-or-minus indication.

Having thus described my invention, what I claim as new and desire to secure by Letters Patent is:

1. A portable gauge for indicating variations in the thickness of curved printing plates comprising a frame having a pair of fixed spaced substantially co-extensive arms, an abutment secured on the inner face at the end of one of said arms to engage the concave face of the printing plate, a thickness indicator carried by the other of said arms and having a plunger extending through said other arm and opposed to said abutment for contacting the convex surface of the printing plate, a clamping member slidably mounted on said other arm, means for guiding said clamping member relative to said other arm in a vertical direction toward and away from said abutment, a pair of transversely-spaced plate-engaging surfaces on said member cooperating with said abutment to orient the gauge in a plane extending radially of the printing plate, a spring normally urging said member in a direction to cause such surfaces to engage the convex surface of the printing plate, and a manually-operable lever for retracting said member to permit application of the gauge to the printing plate.

2. A portable gauge for indicating variations in the thickness of curved printing plates comprising a frame having a pair of fixed spaced substantially co-extensive arms, an abutment secured to the inner face of one of said arms for engaging the concave surface of the printing plate, a thickness indicator carried by the other arm and having a plunger extending through said other arm and opposed to said abutment for engaging the convex surface of the printing plate, a bracket extending outwardly from and integral with said other arm, a lever pivotally mounted in said bracket, a clamping member coupled to one end of said lever between said bracket and said indicator, said clamping member being slidable relative to said other arm and said indicator and said bracket, means for guiding said clamping member in a vertical direction toward and away from said abutment, a pair of transversely-spaced plate-engaging surfaces on said clamping member for engaging the convex surface of the printing plate to orient the gauge in a plane extending radially of the curved printing plate, a spring on said other arm normally urging said clamping member toward said abutment, and a manually-operable extension on said lever for moving said clamping member in a direction opposed to the action of said spring to permit application of the gauge to a printing plate.

3. A portable gauge for indicating variations in the thickness of curved printing plates comprising a frame having a pair of fixed spaced substantially co-extensive arms, an abutment secured to the inner face of one of said arms for engaging the concave surface of the printing plate, a thickness indicator carried by the other arm and having a plunger extending through said other arm and opposed to said abutment for engaging the convex surface of the printing plate, a clamping member having a rod cooperating with a bore in said other arm permitting slidable movement of said clamping member with respect to said other arm in a direction toward and away from said abutment, a pair of transversely-spaced plate-engaging surfaces on said member cooperating with said abutment to orient the gauge in a plane extending radially of the curved plate, a spring engaging said clamping member normally urging said clamping member toward said abutment, and a manually-operable lever for moving said clamping member against the action of said spring to permit application of the gauge to a printing plate.

4. A portable gauge for indicating variations in the thickness of curved printing plates comprising a frame having a pair of fixed spaced substantially co-extensive arms, an abutment secured to the inner face of one of said arms for engaging the concave surface of the printing plate, a thickness indicator carried by the other arm and having a plunger extending through said other arm and opposed to said abutment for engaging the convex surface of the printing plate, a bracket in the form of spaced ears extending from the outer surface of said other arm, a lever pivoted on a pin extending transversely between said ears, a clamping member coupled to said lever between said bracket and said indicator, a rod on said clamping member cooperating with a bore formed in said other arm for guiding sliding movement of said clamping member relative to said other arm and toward and away from said abutment, a pair of spaced plate-engaging surface on said member cooperating with said abutment to orient the gauge in a plane extending radially of the curved printing plate, and a spring engaging said member and normally urging said member toward said abutment, said lever being formed with an extension manually operable to move said clamping member against the action of said spring and permit application of the gauge to a curved printing plate.

5. A portable gauge for indicating variations in the thickness of curved printing plates comprising a frame having a pair of fixed spaced substantially co-extensive arms, an abutment secured to the inner face of one of said arms at the end thereof, a thickness indicator carried by the other arm near its end and having a plunger extending through said other arm and opposed to said abutment, a bracket in the form of a pair of transversely-spaced ears extending from the outer surface of said other arm, a lever pivoted on a pin extending transversely between said ears, a clamping member coupled to one end of said lever between said indicator and said bracket, said clamping member being formed with transversely-spaced legs disposed on opposite sides of said other arm, a rod extending from the web of said clamping member between said legs into a bore formed in said other arm to permit sliding movement of said clamping member relative thereto, said legs being formed with plate-engaging surfaces disposed on opposite sides of said other arm for engaging the convex face of the printing plate and cooperating with said abutment to orient the gauge in a plane extending radially of the curved printing plate, a spring on said other arm engaging said clamping member and normally urging it toward said abutment, and a handle extension on said lever manually operable to move said clamping member against the action of said spring and permit application of the gauge to a printing plate.

6. A portable gauge for indicating variations in the thickness of curved printing plates comprising a frame having a pair of fixed spaced substantially co-extensive arms, an abutment secured in the inner face of one end of one of said arms, a thickness indicator carried by the other of said arms, a plunger extending from said thickness indicator through said other arm near one end thereof and opposed to said abutment for engaging the convex surface of the printing plate, the inner face of said other arm in the area of said plunger being formed with a recess in which a head on said plunger operates, said head being disposed slightly below the inner surface of said other arm in predetermined spaced relation to said abutment, a clamping member on said other arm capable of movement relative thereto, a pair of transversely-spaced plate-engaging surfaces on said member for engaging the convex surface of the printing plate and cooperating with said abutment to orient the gauge in a plane extending radially of the plate, spring means normally urging said clamping member toward said abutment, and a manually-operable lever for moving said clamping member against the action of said spring to permit application of the gauge to the curved printing plate.

7. A portable gauge for indicating variations in the thickness of curved printing plates comprising a frame having a pair of fixed spaced substantially co-extensive arms, an elongated convex abutment secured to the inner face of one of said arms for engaging the concave surface of a printing plate, a thickness indicator carried by the other arm, a plunger for operating said thickness indicator and extending through a bore formed in said other arm, a head on said plunger opposed to and spaced a predetermined distance from said abutment, said other arm being formed with a recess protecting said head and arranged so the surface of said head projects a slight distance below the rim of said recess to engage the convex surface of the printing plate, a bracket in the form of a pair of ears extending from the outer surface of said other arm, a lever carried by a transverse pivot pin extending between said ears, a clamping member arranged between said indicator and said bracket, a rod on said clamping member extending into a bore formed in said other arm to permit sliding movement of said member relative to said other arm and toward and from said abutment, a pair of work-engaging surfaces spaced transversely on said member for engaging the convex surface of the printing plate on opposite sides of the line along which said abutment engages the concave surface of the printing plate to orient the gauge in a plane extending radially of the printing plate through said line, a spring normally urging said clamping member toward said abutment to effect said orientation, and an extension on said lever manually operable to move said clamping member against the action of said spring and permit application of the gauge to the printing plate.

References Cited in the file of this patent
UNITED STATES PATENTS

| | | |
|---|---|---|
| 1,356,214 | Metzger | Oct. 19, 1920 |
| 1,631,896 | St. John et al. | June 7, 1927 |
| 2,051,357 | Zenke | Aug. 18, 1936 |
| 2,520,474 | Shober | Aug. 29, 1950 |

FOREIGN PATENTS

| | | |
|---|---|---|
| 260,891 | Switzerland | Aug. 1, 1949 |